(12) United States Patent
Teraoka

(10) Patent No.: US 7,481,307 B2
(45) Date of Patent: Jan. 27, 2009

(54) TORQUE TRANSMISSION APPARATUS

(75) Inventor: Masao Teraoka, Tochigi (JP)

(73) Assignee: GKN Driveline Torque Technology KK, Tochigi-shi (JP)

( * ) Notice: Subject to any disclaimer, the term of this patent is extended or adjusted under 35 U.S.C. 154(b) by 414 days.

(21) Appl. No.: 11/297,526

(22) Filed: Dec. 7, 2005

(65) Prior Publication Data

US 2006/0124429 A1      Jun. 15, 2006

(30) Foreign Application Priority Data

Dec. 10, 2004    (JP)    ............................. 2004-358491

(51) Int. Cl.
*F16D 28/00*    (2006.01)
*B60K 23/08*    (2006.01)
(52) U.S. Cl. .................. 192/84.6; 192/84.7; 192/94
(58) Field of Classification Search .................. None
See application file for complete search history.

(56) References Cited

U.S. PATENT DOCUMENTS

| 3,235,045 | A | * | 2/1966 | Pop ........................... 192/18 B |
| 4,895,236 | A | * | 1/1990 | Sakakibara et al. ........ 192/84.6 |
| 6,808,053 | B2 | * | 10/2004 | Kirkwood et al. .......... 192/84.6 |

FOREIGN PATENT DOCUMENTS

JP        2003-184993 A     7/2003

* cited by examiner

*Primary Examiner*—Richard M. Lorence
(74) *Attorney, Agent, or Firm*—Jordan and Hamburg LLP

(57) ABSTRACT

The torque transmission apparatus is simple, small and light and has a clutch unit to receive thrust and transmit torque between rotary members, a differential screw mechanism to convert rotational force into the thrust applied to the clutch unit, and an electric motor to produce the rotational force. The differential screw mechanism has a driving screw and driven screws. The driving screw is rotatably and axially movably supported on a rotary drive shaft of the electric motor. The driven screws mesh with the driving screw and are rotatably and axially immovably supported. The meshing driving screw and driven screws are rotated to axially move the driving screw and apply engaging force to the clutch unit.

20 Claims, 9 Drawing Sheets

TORQUE TRANSMISSION APPARATUS

BACKGROUND OF THE INVENTION

1. Field of the Invention

The present invention relates to a torque transmission apparatus used in a torque transmission system of a vehicle.

2. Description of Related Art

An example of a torque transmission apparatus converts the rotational force of an electric motor into thrust to engage a frictional multiplate clutch. To convert rotational force into thrust, the apparatus employs a ball cam. The rotation of the electric motor is input through reduction gears to the ball cam, which generates thrust to engage the frictional multiplate clutch.

This related art separately carries out the rotational speed reduction with the reduction gears and the rotation-to-thrust conversion with the ball cam, to make the apparatus complicated, bulky, and heavy (refer to, for example, Japanese Unexamined Patent Application Publication No. 2003-184993).

SUMMARY OF THE INVENTION

An object of the present invention is to provide a torque transmission apparatus that is simple, small, and light.

In order to accomplish the object, an aspect of the present invention provides a torque transmission apparatus having a clutch unit to receive thrust and transmit torque between rotary members, a differential screw mechanism to convert rotational force into the thrust applied to the clutch unit, and a rotational actuator to produce the rotational force.

Only with the differential screw mechanism, the apparatus can convert rotational force produced by the rotational actuator into thrust. As a result, the apparatus is simple and small.

BRIEF DESCRIPTION OF THE DRAWINGS

FIGS. 2A and 2B are views showing the torque transmission coupling of the first embodiment, in which FIG. 2A is a sectional view showing the coupling and FIG. 2B is a sectional view showing a differential screw mechanism in the coupling;

FIGS. 5A and 5B are views showing a torque transmission coupling according to a fourth embodiment of the present invention, in which FIG. 5A is a sectional view showing the coupling and FIG. 5B is a sectional view showing a differential screw mechanism in the coupling;

DETAILED DESCRIPTION OF EMBODIMENTS

Torque transmission apparatuses or torque transmission couplings according to embodiments of the present invention will be explained. Each of the embodiments employs a differential screw mechanism for the torque transmission apparatus to realize simplicity, compactness, and light weight. In this specification, the "torque transmission apparatus" is substantially synonymous with the "torque transmission coupling."

First Embodiment

Figure 1:
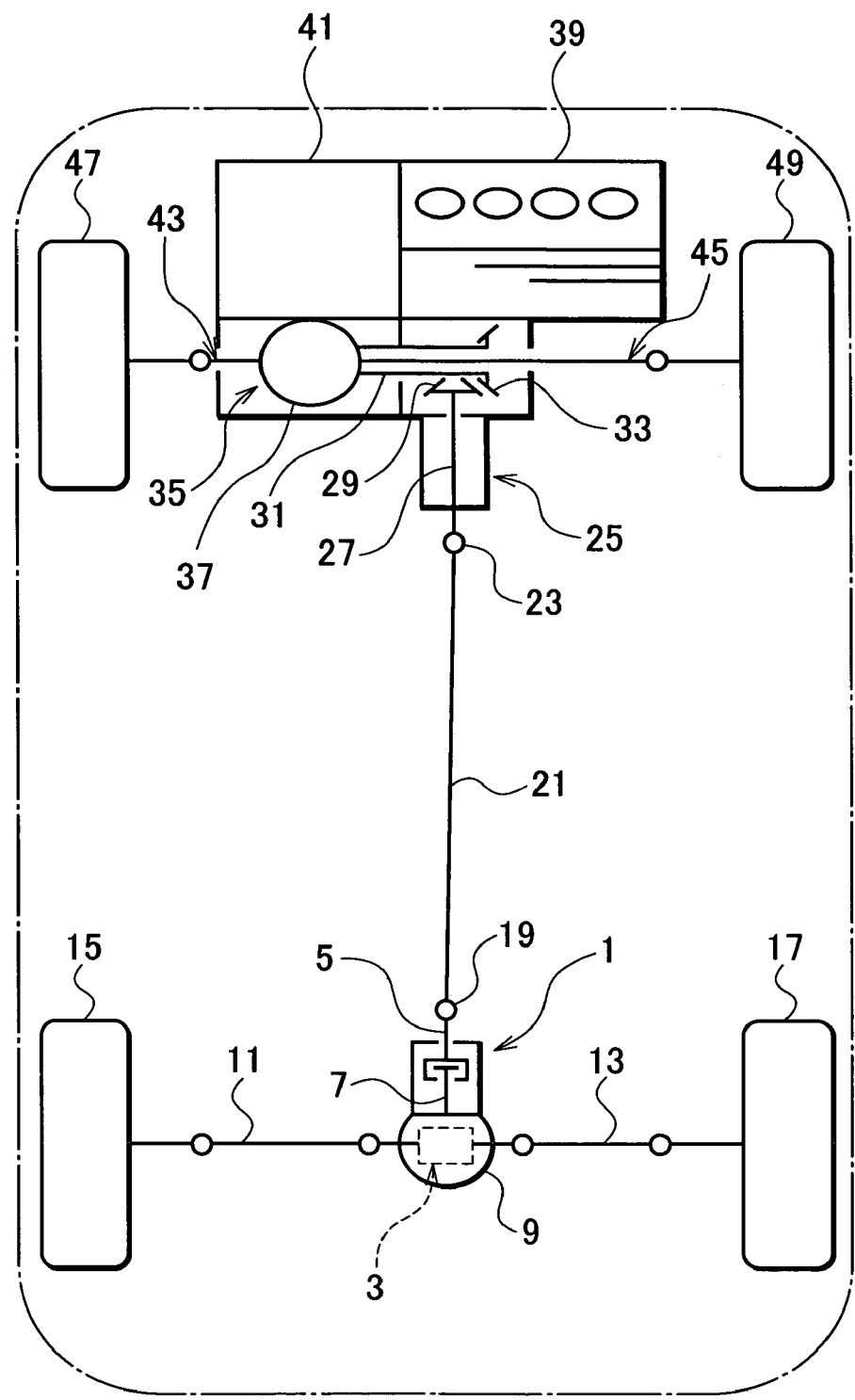
FIG. 1 is a schematic view showing a four-wheel-drive vehicle with a torque transmission coupling according to a first embodiment of the present invention.
Figure 2:
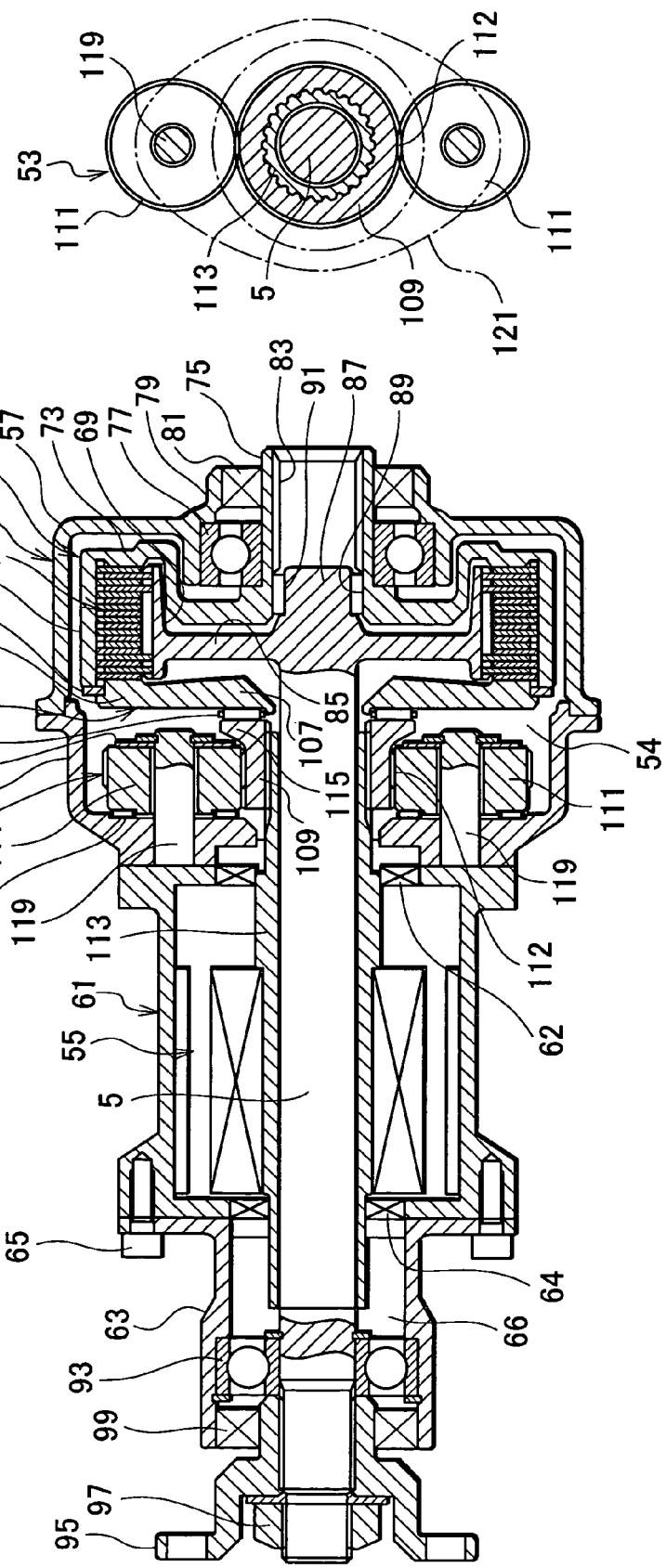

FIGS. 1, 2A, and 2B show a torque transmission apparatus or a torque transmission coupling according to the first embodiment of the present invention. FIG. 1 is a schematic view showing a four-wheel-drive vehicle of a front-engine, front-drive type. FIG. 2A is a sectional view showing the torque transmission apparatus installed in the vehicle and FIG. 2B is a sectional view showing a differential screw mechanism incorporated in the torque transmission apparatus.

[Outline of the Vehicle]

In FIG. 1, the torque transmission apparatus, i.e., the torque transmission coupling 1 is arranged on the input side of a rear differential gear 3 and is interposed between a rotary shaft 5 and a drive pinion shaft 7 serving as rotary members.

The rear differential gear 3 is rotatably supported with a differential carrier 9 and is linked through left and right axle shafts 11 and 13 to left and right rear wheels 15 and 17.

The rotary shaft 5 is connected through a universal joint 19 to a propeller shaft 21. The propeller shaft 21 is connected through a universal joint 23 to an output shaft 27 of a transfer 25.

The output shaft 27 has a bevel gear 29 meshing with a bevel gear 33 of a hollow transmission shaft 31. The hollow transmission shaft 31 is integral and interlocked with a differential case 37 of a front differential gear 35.

The front differential gear 35 receives torque from an engine 39 through a transmission 41. The front differential gear 35 is linked through left and right axle shafts 43 and 45 to left and right front wheels 47 and 49.

The engine 39 generates torque, which is transmitted through the transmission 41 to the front differential gear 35, which transmits the torque through the axle shafts 43 and 45 to the left and right front wheels 47 and 49. At the same time, the front differential gear 35 transmits the torque through the differential case 37, hollow transmission shaft 31, and bevel gears 33 and 29 to the output shaft 27.

The output shaft 27 transmits the torque through the universal joint 23, propeller shaft 21, universal joint 19, and rotary shaft 5 to the torque transmission coupling 1.

If the torque transmission coupling 1 is in a torque transmission state, the torque is transmitted through the drive pinion shaft 7 to the rear differential gear 3. From the rear differential gear 3, the torque is transmitted through the left and right axle shafts 11 and 13 to the left and right rear wheels 15 and 17.

When the torque transmission coupling 1 is in the torque transmission state, the front wheels 47 and 49 and the rear wheels 15 and 17 are driven to achieve a four-wheel driving state. If the torque transmission coupling 1 is not in the torque transmission state, the front wheels 47 and 49 are driven to achieve a two-wheel driving state.

[Torque Transmission Coupling]

FIGS. 2A and 2B show the details of the torque transmission coupling 1.

The torque transmission coupling 1 has a coupling case 50, a clutch unit 51, a differential screw mechanism 53, and an electric motor 55. The clutch unit 51, the differential screw mechanism 53, and the electric motor 55 are installed into the coupling case 50. The electric motor 55 is a rotational actuator having an annular rotor and a stator.

The coupling case 50 includes four components which are a clutch cover 57, a screw cover 59, a motor cover 61, and an end cover 63. The clutch cover 57 and screw cover 59 are detachably fixed together with bolts and nuts. The screw cover 59 and motor cover 61 are detachably fixed together with bolts and nuts. The end cover 63 is detachably fixed to the motor cover 61 with bolts 65. The covers 57, 59, 61, and 63 may be properly integrated to form the coupling case 50.

The clutch unit 51 has a clutch housing 67, a clutch hub 69, and a frictional multiplate clutch 71. The frictional multiplate clutch 71 is interposed between the clutch housing 67 and the clutch hub 69.

According to the first embodiment, the clutch housing 67 serves as an output rotary member and the clutch hub 69 serves as an input rotary member. Instead, the clutch housing 67 may be an input rotary member and the clutch hub 69 may be an output rotary member.

The clutch housing 67 has a vertical wall 73 having a crank-shaped cross section. The vertical wall 73 is integral with a coupling shaft 75 arranged in an inner circumferential side. The coupling shaft 75 is hollow and is rotatably supported through a ball bearing 77 by the inner circumferential face of a shaft support 79 of the clutch cover 57 of the coupling case 50. Between the shaft support 79 and the coupling shaft 75, there is a seal 81. Sectioning seals 62 and 64 are arranged in both sides of the motor cover 61 in an axial direction, respectively. Due to this, a lubricating environment of the frictional multiplate clutch 71 and differential screw mechanism 53 within a space 54 is independent of the interior of the differential carrier 9 by the seals 81 and 62. In this case, a space 66 within the end cover 63 is communicated with the space 54 through a gap between the rotary shaft 5 and a rotary drive shaft 113 mentioned below. It may set the gap to be minute or employ a sectioning seal arranged between the rotary shaft 5 and the rotary drive shaft 113, so that the spaces 54 and 66 are separated from each other. Accordingly, lubricating environments of the spaces 45 and 66 are independent of each other. The coupling shaft 75 has inner splines 83 that engage with the drive pinion shaft 7.

The clutch hub 69 has a vertical wall 85 that is integral with the rotary shaft 5. A front end 87 of the rotary shaft 5 is engaged and supported with a needle bearing 91 in a shaft hole 89 of the coupling shaft 75. The rotary shaft 5, clutch hub 69, and vertical wall 85 may be made of separate parts that are connected together.

The frictional multiplate clutch 71 transmits torque between the clutch hub 69 and the clutch housing 67, i.e., between the rotary shaft 5 and the drive pinion shaft 7. The frictional multiplate clutch 71 has outer plates and inner plates. The outer plates are attached to the clutch housing 67 and the inner plates are attached to the clutch hub 69.

The other end of the rotary shaft 5 is supported with a ball bearing 93 in the end cover 63 of the coupling case 50. An outer end of the rotary shaft 5 has splines engaging with a flange 95. The flange 95 is fixed to the rotary shaft 5 with a nut 97, so that the flange 95 may not come off the rotary shaft 5. Between the flange 95 and the end cover 63, there is a seal 99. The flange 95 is connected to the universal joint 19.

Between ends of the clutch housing 67 and clutch hub 69, there is a pushing part 103 of a pusher 101 facing to the frictional multiplate clutch 71. The pusher 101 is made of an annular plate. Between the pushing part 103 and the clutch housing 67, there is a disk spring 105, serving as a biasing member, that biases to push the pusher 101 away from the frictional multiplate clutch 71. An inner circumferential part of the pusher 101 has an integral thrust receiver 107.

Adjacent to the pusher 101, there is the differential screw mechanism 53 that converts rotational input force into thrust to be applied to the clutch unit 51.

The differential screw mechanism 53 includes a driving screw 109 and driven screws 111. The driving screw 109 and driven screw 111 have slightly different diameters. According to the first embodiment, the diameter of the driving screw 109 is greater than that of the driven screw 111. The first embodiment employs two driven screws 111. Each driven screw 111 meshes with the driving screw 109 at a meshing part 112.

The driving screw 109 engages with splines formed on the rotary drive shaft 113, which is arranged on the center axis side of the electric motor 55 being annular. The driving screw 109 is axially movable along the shaft 113 and is rotatable with the shaft 113. The shaft 113 is rotatable around the rotary shaft 5 that passes through the shaft 113. In this way, these components are arranged around the center axis, to improve the connection freedom of the torque transmission system and reduce the size of the torque transmission coupling 1. An end of the driving screw 109 has a flange 115 that is in contact with a needle bearing 117 on the thrust receiver 107 of the pusher 101. The shaft 113 may be supported to a fixed member such as the screw cover 59, the motor cover 61, or the end cover 63 with bearings.

The driven screws 111 are arranged at predetermined intervals along an outer circumference of the driving screw 109. Each driven screw 111 meshes with the driving screw 109 through single threads having the same pitch. Instead, the driven screw may mesh with the driving screw through multi threads that are double threads or more threads, to reduce pressure between meshing faces and improve accuracy of meshing positions. Each driven screw 111 is rotatably supported with a shaft 119 fixed to the screw cover 59 and is immovable in an axial direction. The shafts 119 are provided with a plate 121 that are in contact with end faces of the driven screws 111 and collectively maintains the positions of the shafts 119. Between each driven screw 111 and the screw cover 59, there is needle bearings 123. Namely, one end face of each driven screw 111 is supported with the plate 121, and the other end face thereof is supported through the needle bearing 123 by the screw cover 59.

A radial distance from the axial center of the rotary shaft 5 to the clutch unit 51 is set to be greater than a radial distance from the axial center of the rotary shaft 5 to each meshing part 112. The annular pusher 101 is extended in a radial direction, to transfer thrust to the clutch unit 51. This configuration prevents slight meshing vibration occurring at the meshing parts 112 from being directly propagated to the pushing part 103, to stabilize the engagement of the clutch unit 51.

The electric motor 55 has the rotary drive shaft 113 serving as an output shaft. The rotary drive shaft 113 and driving screw 109 are coaxial. The electric motor 55 or a rotary member linked to the electric motor 55 is provided with an encoder for detecting the number of rotations on its axis or a rotation angle of the electric motor 55. The encoder is used to feed-back-control the rotation speed of the electric motor 55, to thereby correctly control the engagement of the frictional multiplate clutch 71. The encoder may be an optical encoder or a magnetic encoder. The optical encoder employs a disk that has a slit formed by an opening and is attached to a rear end of the output shaft of the electric motor 55. The optical encoder also employs a photosensor to count the number of pulses produced by the slit disk. According to the count, the number of rotations or a rotation angle of the electric motor 55 is calculated. The magnetic encoder utilizes the characteristics of a Hall element to generate a pulse signal according to the number of poles of a ring magnet. With the magnetic encoder, the detection and control of the rotation speed of the electric motor 55 become easier.

The magnitude of thrust applied to the clutch unit 51 is also adjustable according to the value of a current supplied to the electric motor 55 or change of pulse voltage depending on pulse-width modulation (PWM) control.

[Torque Connection and Disconnection]

When the frictional multiplate clutch 71 is disengaged, the clutch housing 67 and clutch hub 69 can turn relative to each other. In this case, torque transmitted from the engine 39 to the clutch hub 69 through the rotary shaft 5 is not transmitted to the clutch housing 67. Namely, the torque transmission coupling 1 is in a state not to transmit torque, and the vehicle runs in a two-wheel driving state that drives the front wheels 47 and 49.

When the electric motor 55 is driven to turn, the rotary drive shaft 113 and driving screw 109 rotate together, to rotate the driven screws 111 meshing with the driving screw 109. The driving screw 109 and each driven screw 111 mesh with each other through single threads of the same pitch, and therefore, they will turn together at a fixed position if they have the same diameter.

According to the first embodiment, the driving screw 109 and driven screw 111 have slightly different diameters. Namely, the diameter of the driving screw 109 is slightly larger than that of the driven screw 111. As a result, the axial positions of the screws 109 and 111 shift from each other depending on the difference between the circumferential lengths of the screws 109 and 111. Faces of the screws 109 and 111 at the meshing part 112 roll on each other without sliding on each other, and the relative axial positions of the driving screw 109 and driven screw 111 slightly shift. This efficiently converts the torque of the electric motor 51 into thrust without employing a special reduction mechanism. Each driven screw 111 is supported through the needle bearing 123 by the screw cover 59, so that reaction on the driven screw 111 acts on the driving screw 109, to generate thrust. Due to the thrust, the driving screw 109 pushes, through the needle bearing 117, the pushing part 103 of the pusher 101. According to the first embodiment, the driven screws 111 are axially immovable, and therefore, the driving screw 109 axially advances to push the clutch unit 51 through the pusher 101. If the driving screw 109 is axially fixed, the driven screws 111 axially advance to push the clutch unit 51 minutely, i.e., the driven screws 111 axially move while adjusting minutely. Namely, one of the driving screw and driven screws can be axially advanced to push the clutch unit 51.

Thrust from the driving screw 109 moves the pusher 101, and the pushing part 103 of the pusher 101 pushes the frictional multiplate clutch 71 of the clutch unit 51. As a result, the frictional multiplate clutch 71 engages between the pushing part 103 and the vertical wall 73 of the clutch housing 67. The frictional multiplate clutch 71 produces frictional engaging force according to the thrust from the pusher 101, to transmit torque between the clutch hub 69 and the clutch housing 67.

In this way, the torque from the rotary shaft 5 is transmitted through the clutch hub 69 and frictional multiplate clutch 71 to the clutch housing 67. From the clutch housing 67, the torque is transmitted through the coupling shaft 75 to the drive pinion shaft 7. From the drive pinion shaft 7, the torque is transmitted to the rear wheels 15 and 17 as mentioned above. Then, the vehicle runs in a four-wheel driving state in which the front wheels 47 and 49 and rear wheels 15 and 17 are driven.

When the electric motor 55 is stopped, the thrust of the driving screw 109 disappears, and the force of the disk spring 105 or reverse rotation of the electric motor 55 returns the pusher 101 to an original position. Then, the frictional multiplate clutch 71 is disengaged to resume the two-wheel driving state.

In this way, the first embodiment drives the electric motor 55 to efficiently make the differential screw mechanism 53 turn and produce thrust that engages the frictional multiplate clutch 71. The differential screw mechanism 53 may employ large-diameter screws to efficiently transmit thrust to engage the clutch. The first embodiment needs no reduction mechanism in addition to the differential screw mechanism 53, and therefore, the torque transmission apparatus 1 of the first embodiment is simple, small, and light. The driving and driven screws may have large pitches. In this case, the diameters of the screws are made close to each other to realize fine motion and improve reliability.

The diameter of the driving screw 109 may be slightly smaller than that of the driven screw 111. This configuration is also effective to engage the frictional multiplate clutch 71. In the torque transmission route between the electric motor 55 and the driving screw 109, a reduction mechanism such as a reduction gear may be arranged.

Second Embodiment

Figure 3:
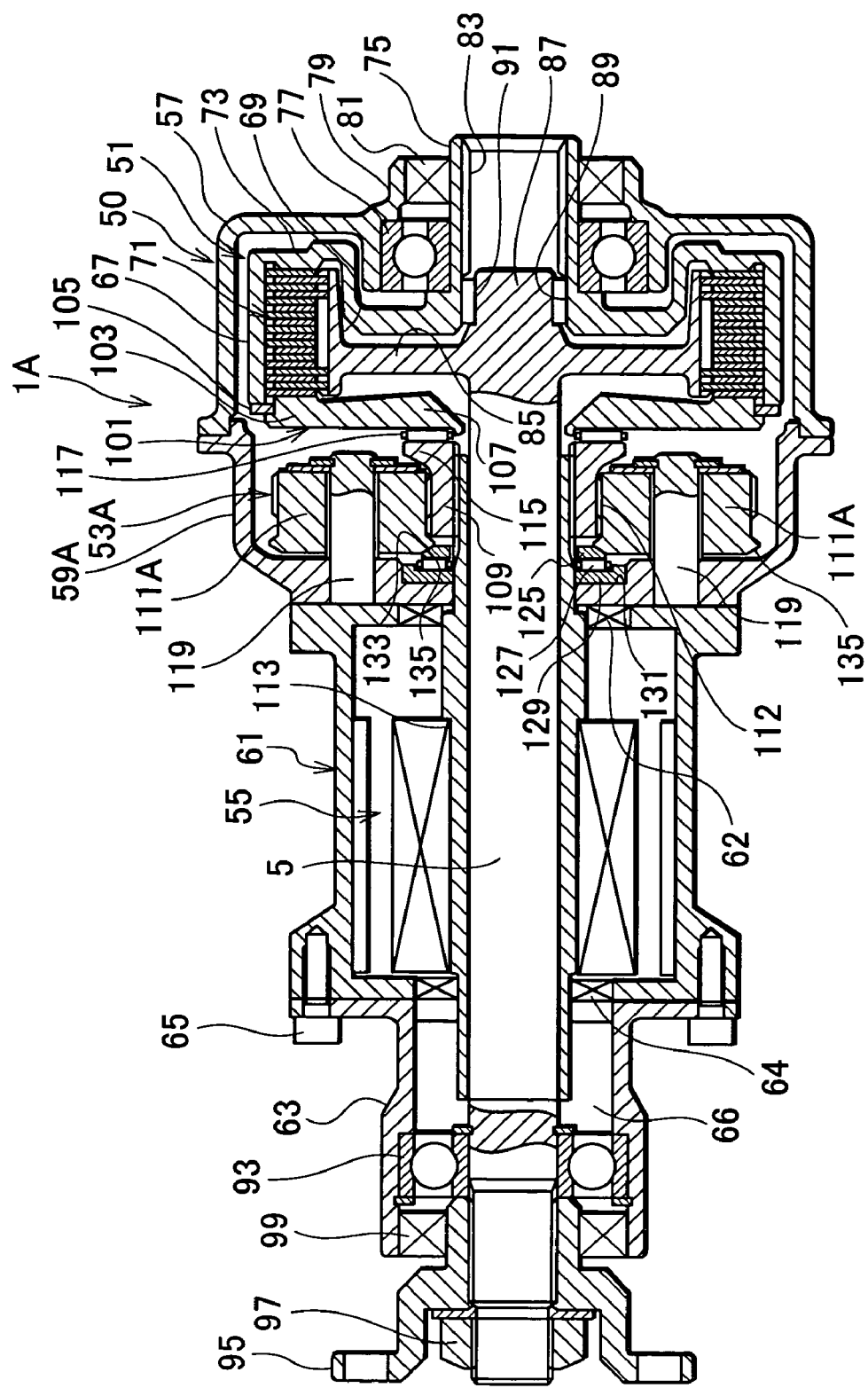
FIG. 3 is a sectional view showing a torque transmission coupling according to a second embodiment of the present invention.

FIG. 3 is a sectional view showing a torque transmission coupling according to the second embodiment of the present invention. In FIG. 3, parts corresponding to those of FIGS. 2A and 2B are represented with the same reference numerals or the same reference numerals plus "A."

According to the second embodiment, a differential screw mechanism 53A includes driven screws 111A. No needle bearing is arranged between an end face of each driven screw 111A and a screw cover 59A. Instead, a rotation receiver 125 is arranged behind the driving screw 109, to receive each driven screw 111A.

The rotation receiver 125 is rotatably supported with a needle bearing 127, which is arranged in a bearing race 129. The bearing race 129 is supported in a recess 131 formed along an inner circumference of the screw cover 59A.

The rotation receiver 125 has a tapered face 133 that is in contact with a tapered face 135 of each driven screw 111A.

When the driving screw 109 and driven screws 111A turn, the tapered faces 133 and 135 receive thrust, and reaction from force acting on the recess 131 of the screw cover 59A thrusts the driving screw 109.

In this way, the second embodiment can adjust the engaging force of the clutch unit 51 and engage/disengage the clutch unit 51 by adjusting the rotation speed of the electric motor 55 or by turning on/off the electric motor 55. Namely, the second embodiment is capable of achieving the same operation and effect as those achieved by the first embodiment. The second embodiment forms the tapered faces 133 and 135 at locations axially shifted from the meshing parts of the driving screw 109 and driven screws 111A. This configuration surely makes reaction from the screw cover 59A thrust the driving screw 109.

Third Embodiment

Figure 4:
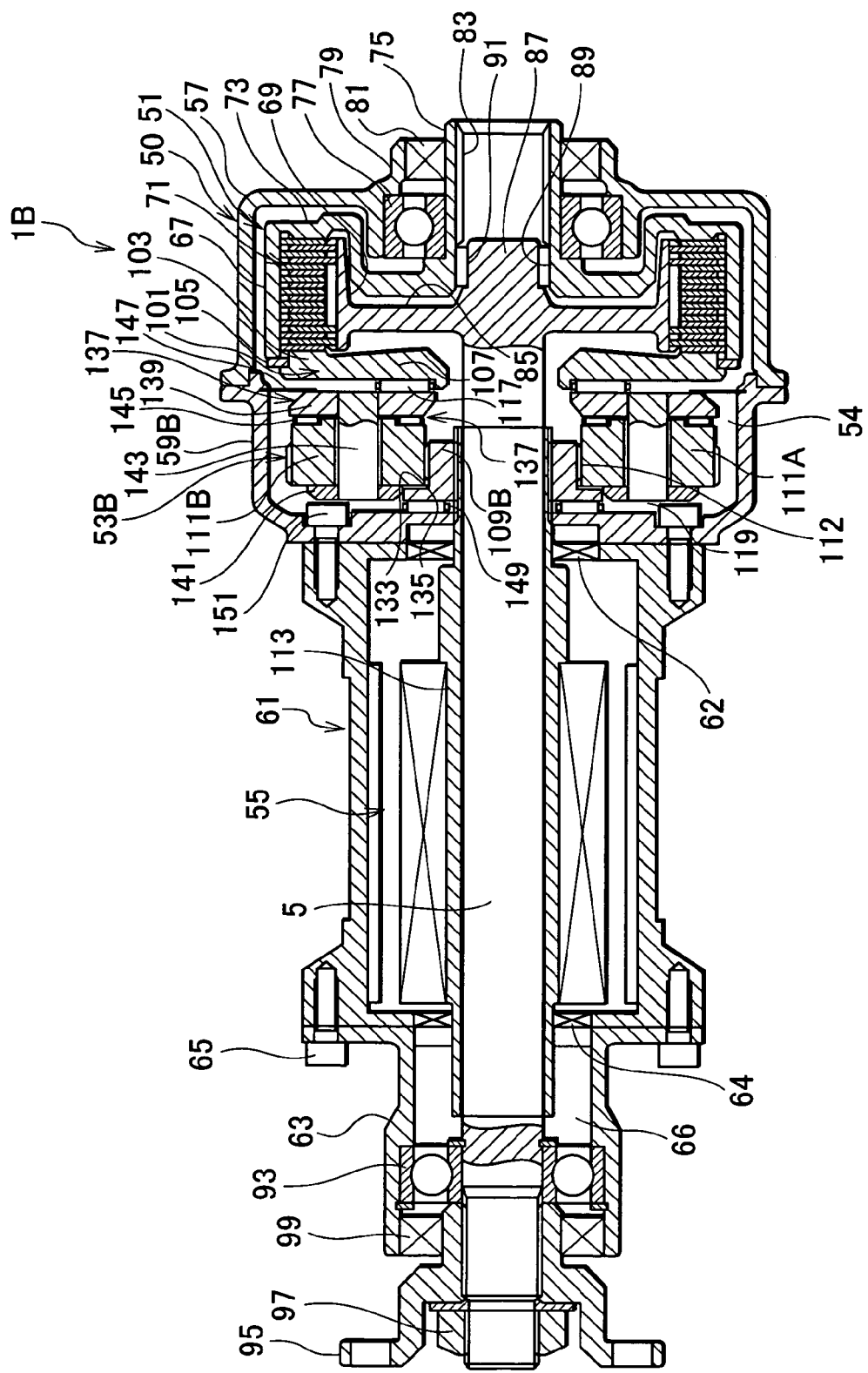
FIG. 4 is a sectional view showing a torque transmission coupling according to a third embodiment of the present invention.

FIG. 4 is a sectional view showing a torque transmission coupling according to the third embodiment of the present invention. In FIG. 4, parts corresponding to those of FIGS. 2A and 2B are represented with the same reference numerals or the same reference numerals plus "B."

According to the third embodiment, a differential screw mechanism 53B includes driven screws 111B that are rotatably supported with a carrier 137. The driven screws 111B and carrier 137 axially move to engage the clutch unit 51.

The carrier 137 includes a pair of carrier plates 139 and 141 and carrier pins 143. Each carrier pin 143 rotatably supports the driven screw 111B. Between the driven screws 111B and the carrier plate 139, there is a needle bearing 145.

An outer circumferential part of the carrier plate 139 is provided with a spring plate 147, which is fixed to a screw cover 59B. The spring plate 147 flexes to allow an axial movement the carrier plate 139. The spring plate 147 is fixed to the screw cover 59B so that the carrier plate 139 is unable to turn. An inner circumferential part of the carrier plate 139 is in contact with the thrust receiver 107 of the pusher 101 through a needle bearing 117.

The driven screws 111B mesh with a driving screw 109B. The driving screw 109B engages with the rotary drive shaft 113 through splines and is axially supported with the screw cover 59B through a needle bearing 149.

The screw cover 59B is fastened to the motor cover 61 with bolts 151.

When the meshing driving screw 109B and driven screws 111B turn, the screw cover 59B receives thrust through the needle bearing 149, and reaction of the thrust axially pushes the driven screws 111B and carrier 137. Then, the carrier plate 139 thrusts the pusher 101 through the needle bearing 117, so as to apply engaging force to the clutch unit 51.

In this way, the third embodiment can adjust the engaging force of the clutch unit 51 and engage/disengage the clutch unit 51 by adjusting the rotation speed of the electric motor 55 or by turning on/off the electric motor 55. Namely, the third embodiment is capable of achieving the same operation and effect as those achieved by the first embodiment. The third embodiment can shorten the distance between the pushing part 103 of the pusher 101 and the thrust receiver 107, to surely transfer thrust to the clutch unit 51 and thin the pusher 101.

Fourth Embodiment

Figure 5:
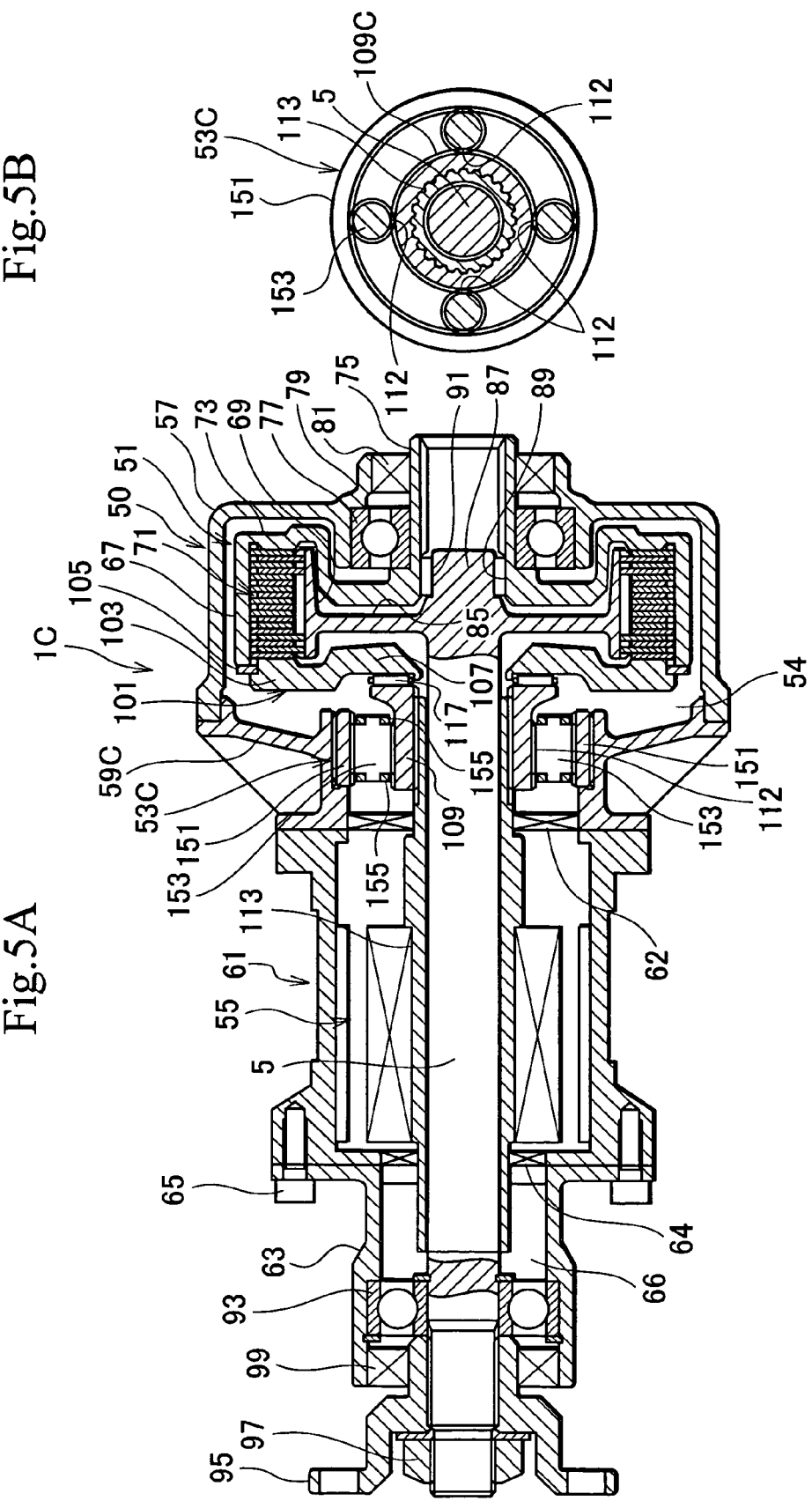

FIGS. 5A and 5B show a torque transmission coupling according to the fourth embodiment of the present invention, in which FIG. 5A is a sectional view showing the torque transmission coupling and FIG. 5B is a sectional view showing a differential screw mechanism. In FIGS. 5A and 5B, parts corresponding to those of FIGS. 2A and 2B are represented with the same reference numerals or the same reference numerals plus "C."

The fourth embodiment forms the differential screw mechanism 53C with a driving screw 109, a fixed screw 151, and driven screws 153. Like the first embodiment, the driving screw 109 is supported on the rotary drive shaft 113 and is axially movable. The fixed screw 151 is arranged around the driving screw 109 and facing to periphery of the driving screw 109 and is fitted to a screw cover 59C with splines. The driven screws 153 are respectively arranged between the driving screw 109 and the fixed screw 151 and mesh with the driving screw 109 and fixed screw 151. The driven screws 153 are supported with annular plates 155.

When the driving screw 109 is turned, the driven screws 153 rotate between the driving screw 109 and the fixed screw 151, to axially move the driving screw 109 and apply engaging force to the clutch unit 51.

In this way, the fourth embodiment can adjust the engaging force of the clutch unit 51 and engage/disengage the clutch unit 51 by adjusting the rotation speed of the electric motor 55 or by turning on/off the electric motor 55. Namely, the fourth embodiment is capable of achieving the same operation and effect as those achieved by the first embodiment. In addition, the fourth embodiment is capable of quickly moving the driving screw in an axial direction, to thereby improve response in adjusting the clutch engaging force and response of clutch engaging/disengaging operation.

Fifth Embodiment

Figure 6:
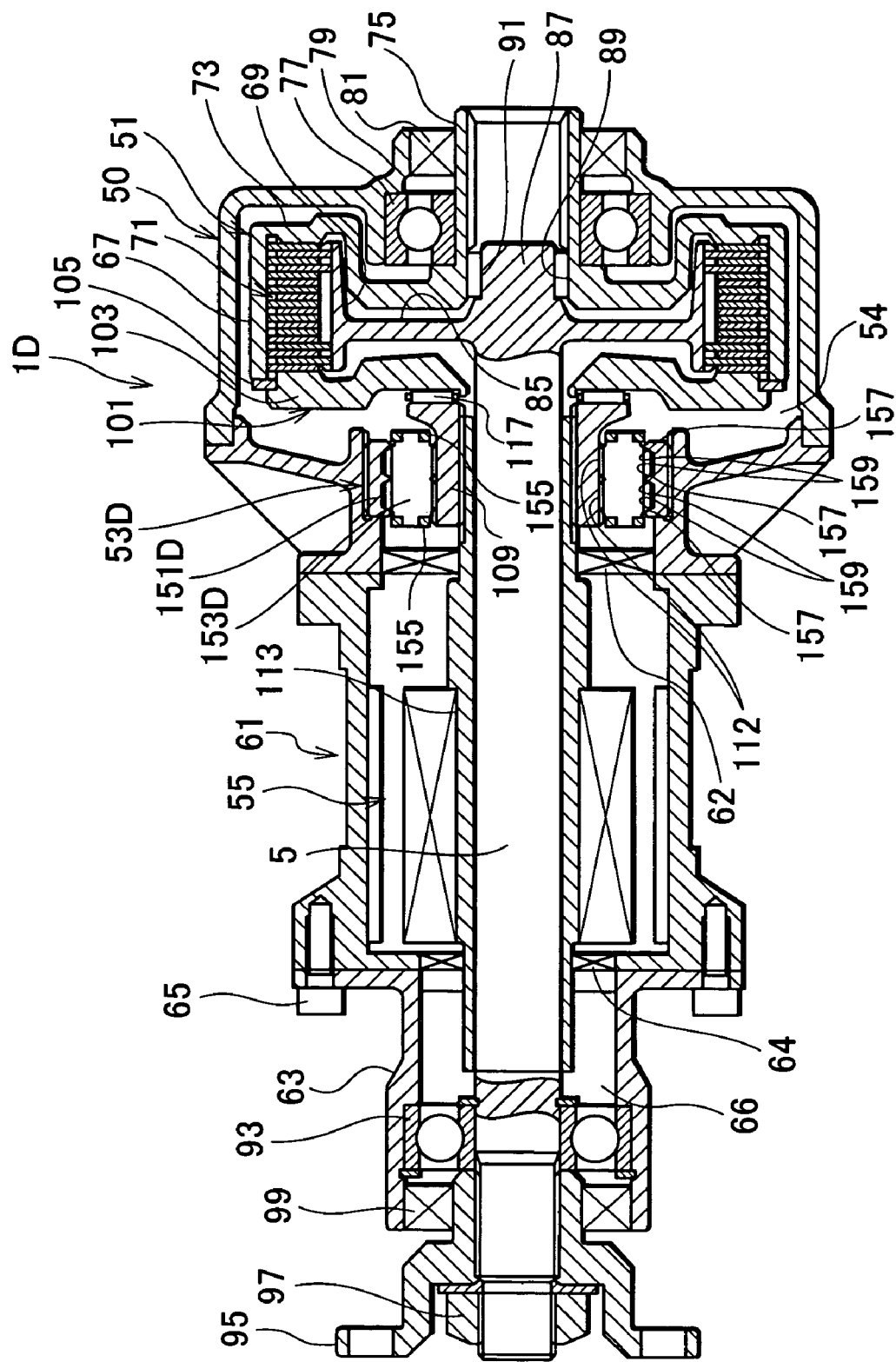
FIG. 6 is a sectional view showing a torque transmission coupling according to a fifth embodiment of the present invention.

FIG. 6 is a sectional view showing a torque transmission coupling according to the fifth embodiment of the present invention. In FIG. 6, parts corresponding to those of FIGS. 5A and 5B are represented with the same reference numerals or the same reference numerals plus "D" instead of "C."

The fifth embodiment employs a differential screw mechanism 53D that is substantially the same as the differential screw mechanism 53C. Between a fixed screw 151D and driven screws 153D, the fifth embodiment forms tapered faces 157 and 159 that receive force to produce reaction acting as thrust.

The fifth embodiment achieves the same operation and effect as those achieved by the fourth embodiment. When the driving screw 109 is turned, the driven screws 153D are surely received with the fixed screw 151D through the tapered faces 157 and 159, to thereby surely apply engaging force to the clutch unit 51.

Sixth Embodiment

Figure 7:
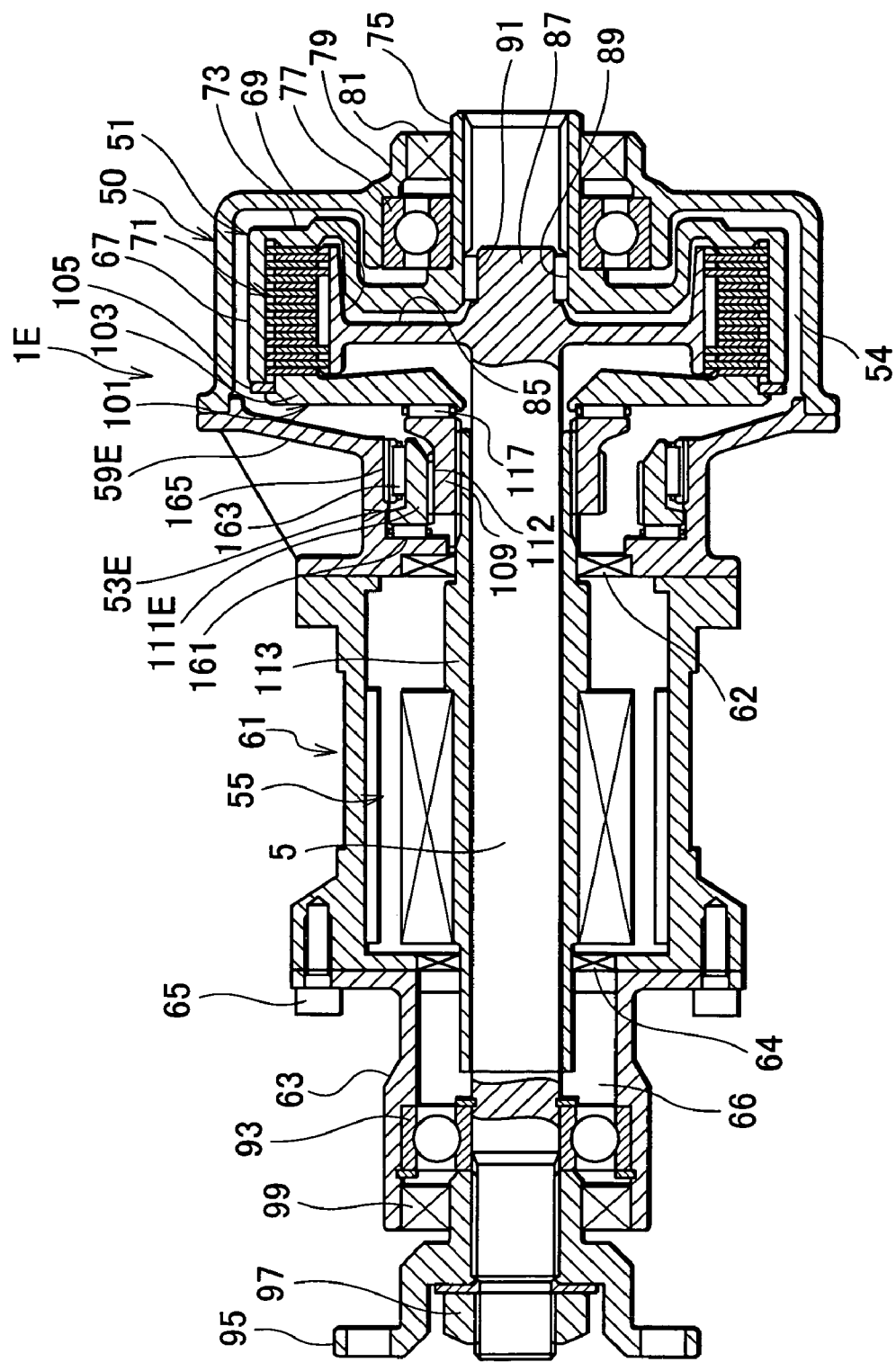
FIG. 7 is a sectional view showing a torque transmission coupling according to a sixth embodiment of the present invention.

FIG. 7 is a sectional view showing a torque transmission coupling according to the sixth embodiment of the present invention. In FIG. 7, parts corresponding to those of FIGS. 2A and 2B are represented with the same reference numerals or the same reference numerals plus "E."

The sixth embodiment employs a differential screw mechanism 53E including a driving screw 109 and driven screw 111E. Like the first embodiment, the driving screw 109 is supported on the rotary drive shaft 113 and is axially movable. The driven screw 111E has an annular shape around the driving screw 109. The driven screw 111E is eccentrically arranged to mesh with the driving screw 109 such that an inner peripheral thread of the driven screw 111E meshes with an outer peripheral thread of the driving screw 109, and are axially immovable. Through a needle bearing 161, each driven screw 111E is axially received by a screw cover 59E.

The periphery of each driven screw 111E is rotatably supported with a needle bearing 163, which is supported in a bearing race 165 to be received with the screw cover 59E.

When the meshing driving screw 109 and driven screws 111E rotate, the screw cover 59E receives thrust through the needle bearing 161, to produce reaction that produces thrust to axially move the driving screw 109. Then, the driving screw 109 pushes the pusher 101 through a needle bearing 117, to thereby engage the clutch unit 51.

In this way, the sixth embodiment can adjust the engaging force of the clutch unit 51 and engage/disengage the clutch unit 51 by adjusting the rotation speed of the electric motor 55 or by turning on/off the electric motor 55. Namely, the sixth embodiment is capable of achieving the same operation and effect as those achieved by the first embodiment. The sixth embodiment eccentrically arranges the driven screws 111E, to provide a marginal space on a radial side of the driving screw 109.

In each of the above-mentioned embodiments, the torque transmission apparatus or the torque transmission coupling is connected to the drive pinion shaft 7 of the rear-wheel differential gear 3. Instead, the torque transmission apparatus may be arranged as shown in FIGS. 8 to 11. In FIGS. 8 to 11, parts that are the same or correspond to those of FIG. 1 are represented with the same reference numerals or the same reference numerals plus "F" to "I."

Figure 8:
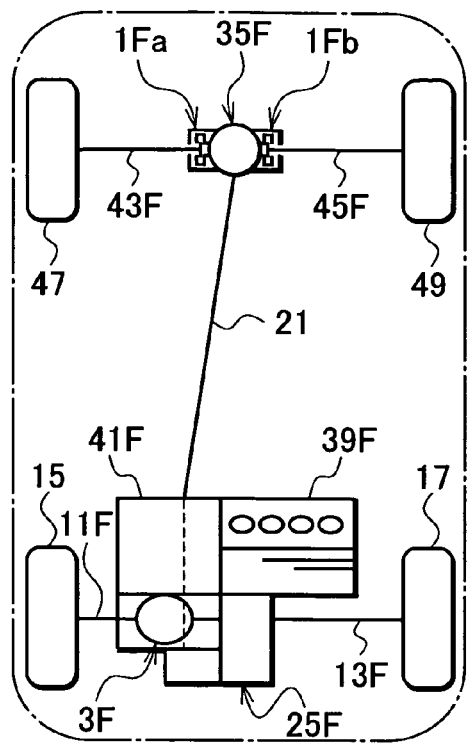
FIG. 8 is a schematic view showing an arrangement of a four-wheel-drive vehicle with the torque transmission coupling according to any one of the first to sixth embodiments of the present invention.

FIG. 8 is a schematic view showing an arrangement of a four-wheel-drive vehicle with the torque transmission coupling according to any one of the first to sixth embodiments of the present invention. The vehicle is of a rear-engine, rear-drive type (RR type). In FIG. 8, torque transmission couplings 1Fa and 1Fb are arranged between a front differential gear 35F and left and right axle shafts 43F and 45F. Rotary shafts 5 of the torque transmission couplings 1Fa and 1Fb are connected to side gears of the front differential gear 35F, and coupling shafts 75 thereof are connected to the left and right axle shafts 43F and 45F.

An engine 39F generates torque, which is transmitted through a transmission 41F to a rear differential gear 3F. From the rear differential gear 3F, the torque is transmitted through axle shafts 11F and 13F to left and right rear wheels 15 and 17. At the same time, the torque from the rear differential gear 3F is transmitted through a transfer 25F and a propeller shaft 21 to the front differential gear 35F.

From the front differential gear 35F, the torque is transmitted through the torque transmission couplings 1Fa and 1Fb and axle shafts 43F and 45F to the left and right front wheels 47 and 49 according to torque transmission adjustments of the torque transmission couplings 1Fa and 1Fb. The torque is properly transmitted to the front wheels 47 and 49 according to states such as slippage of the front wheels 47 and 49.

Figure 9:
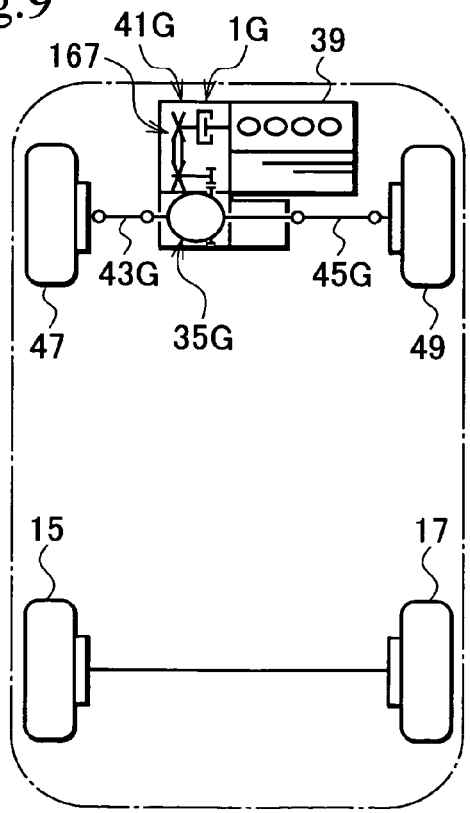
FIG. 9 is a schematic view showing an arrangement of a two-wheel-drive vehicle with the torque transmission coupling according to any one of the first to sixth embodiments of the present invention.

FIG. 9 is a schematic view showing an arrangement of a two-wheel-drive vehicle with the torque transmission coupling according to any one of the first to sixth embodiments of the present invention. In FIG. 9, the torque transmission coupling 1G serves as a start clutch. Torque of an engine 39 is transmitted through a transmission 41G, the torque transmission coupling 1G, and a belt-type continuously variable transmission (CVT) 167 to a front differential gear 35G.

Namely, torque from the engine 39G is transmitted through the torque transmission apparatus 1G and belt-type CVT 167 to the front differential gear 35G From the front differential gear 35G, the torque is transmitted through left and right axle shafts 43 and 35 to left and right front wheels 47 and 49.

Depending on a torque transmission adjustment of the torque transmission coupling 1G serving as a start clutch, the torque of the engine 39G is transmitted to the left and right front wheels 47 and 49, so that the vehicle carries out start running and normal running in a two-wheel driving state to drive the front wheels 47 and 49.

Figure 10:
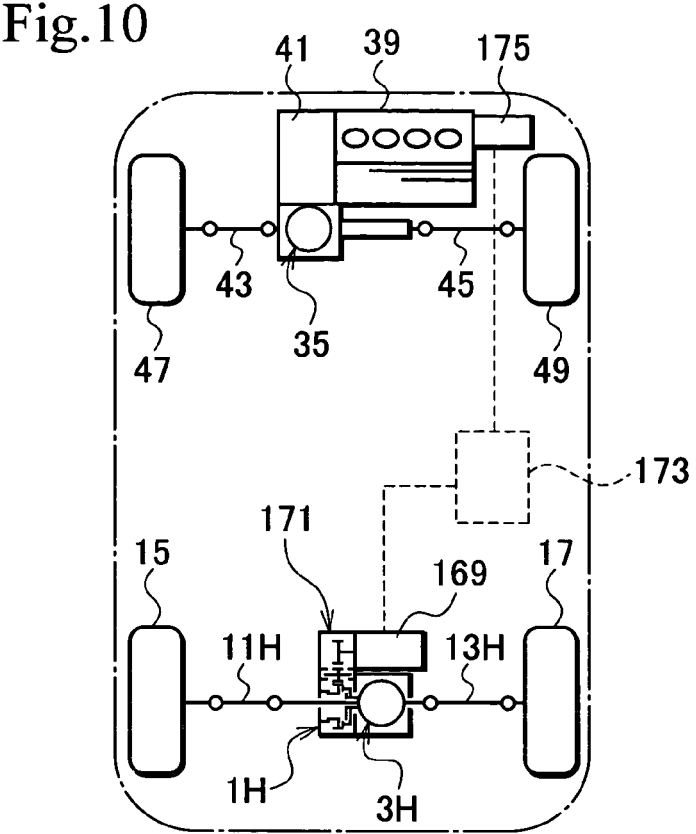
FIG. 10 is a schematic view showing another arrangement of a four-wheel-drive vehicle with the torque transmission coupling according to any one of the first to sixth embodiments of the present invention.

FIG. 10 is a schematic view showing an arrangement of a four-wheel-drive vehicle with the torque transmission coupling according to any one of the first to sixth embodiments of the present invention. In FIG. 10, the vehicle has an internal combustion engine 39 serving as a main driving source and an electric motor 169 serving as a secondary driving source. In this embodiment, the engine 39 drives left and right front wheels 47 and 49, and the electric motor 169 assists to drive left and right rear wheels 15 and 17. Alternatively, the electric motor 169 may drive the front wheels and the engine 39 may drive the rear wheels.

Output of the engine 39 is transmitted through a transmission 41 to a front differential gear 35, which is connected through left and right axle shafts 43 and 45 to the front wheels 47 and 49.

Output of the electric motor 169 is input to a reduction driver 171. The reduction driver 171 has the torque transmission apparatus 1H to transmit the output of the reduction driver 171 to a rear differential gear 3H. The rear differential gear 3H is connected through left and right axle shafts 11H and 13H to the left and right rear wheels 11 and 13. A rotary shaft 5 of the torque transmission apparatus 1H is connected to, for example, the reduction driver 171, and a coupling shaft 75 thereof is connected to a case of the rear differential gear 3H.

The electric motor 169 receives power from a battery 173. The battery 173 is charged from a motor generator or a generator 175 that generates power with the output of the engine 39. When the vehicle decelerates, power generated by the generator 175 is used to charge the battery 173.

During a normal running, torque of the engine 39 is transmitted through the transmission 41 to the front differential gear 35. The torque of the front differential gear 35 is transmitted through the left and right axle shafts 43 and 45 to the left and right front wheels 47 and 49.

The rotation of the engine 39 makes the generator 175 generate power to charge the battery 173. The battery 173 supplies power to the electric motor 169 whose output is transmitted to the reduction driver 171. Depending on a torque transmission adjustment of the torque transmission apparatus 1H, the torque of the reduction driver 171 is transmitted to the rear differential gear 3H. The torque of the rear differential gear 3H is transmitted through the left and right axle shafts 11H and 13H to the left and right rear wheels 15 and 17.

As a result, the vehicle can drive in a four-wheel driving state with the engine 39 driving the front wheels 47 and 49 and the electric motor 169 supplementally driving the rear wheels 15 and 17.

Figure 11:
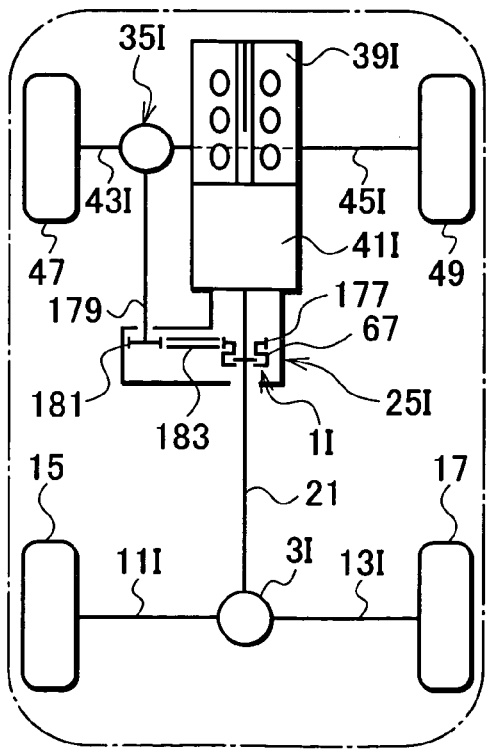
FIG. 11 is a schematic view showing still another arrangement of a four-wheel-drive vehicle with the torque transmission coupling according to any one of the first to sixth embodiments of the present invention.

FIG. 11 is a schematic view showing an arrangement of a four-wheel-drive vehicle with the torque transmission coupling according to any one of the first to sixth embodiments of the present invention. In FIG. 11, the torque transmission coupling 1I is arranged as a connection/disconnection mechanism for a transfer 25I. A rotary shaft 5 of the torque transmission apparatus 1I is directly connected to a rear propeller shaft 21. A clutch housing 67 of the torque transmission apparatus 1I has a sprocket 177. Around the sprocket 177 and a sprocket 181 connected to a front propeller shaft 179, a chain 183 is wound.

Torque of an engine 39I is transmitted through a transmission 41I to the transfer 25I. The torque of the transfer 25I is transmitted through a rear differential gear 3I and axle shafts 11I and 13I to left and right rear wheels 15 and 17. At the same time, the torque of the transfer 25I is transmitted through the torque transmission apparatus 1I, sprocket 177, chain 183, and sprocket 181 to the propeller shaft 179 for front wheels. The torque of the propeller shaft 179 is transmitted through a front differential gear 35I and left and right axle shafts 43I and 45I to the left and right front wheels 47 and 49.

Depending on a torque transmission adjustment of the torque transmission coupling 1I, torque can be transmitted to the front wheels 47 and 49 so that the vehicle may run in a two-wheel driving mode that drives only the front wheels 47 and 49 or in a four-wheel driving mode that drives the front wheels 47 and 49 as well as the rear wheels 15 and 17.

In any one of the above-mentioned embodiments, the clutch unit 51 is not limited to the frictional multiplate clutch. The clutch unit 51 may be another type of frictional clutch such as a cone clutch, or a clutch composed of a pair of meshing gears.

It may employ an actuator which converts a wide variety of energies such as air pressure, hydraulic pressure, magnetic force, force depending on fluid flowage, sound wave, or oscillation into actuating force as the rotational actuator. Namely, the rotational actuator is not limited to the electric motor 55.

In above-mentioned embodiments of the present invention, the clutch unit 51, the differential screw mechanism 53, and the rotational actuator are arranged along the axial direction. Instead, these components may be arranged to overlap to each other in the radial direction according to peripheral spaces of the torque transmission coupling or a relationship between the torque transmission coupling and peripheral members thereof. In this case, it can shorten the length of the torque transmission coupling in the axial direction.

The rotational actuator and a drive shaft for transmitting the actuator force do not need to be axially arranged, or be parallel or perpendicular to each other.

What is claimed is:

1. A torque transmission apparatus comprising:
a clutch unit configured to receive thrust and transmit torque between rotary members;
a differential screw mechanism configured to convert rotational force into the thrust applied to the clutch unit;
a rotational actuator configured to produce the rotational force;
the differential screw mechanism having a driving screw and a driven screw that arc each rotatably supported, the driving screw being driven by the rotational actuator to rotate;
each of the driving screw and the driven screw having a threaded portion;
the threaded portions meshing with each other to gear the driven screw to the driving screw so that the driven screw is rotated by the driving screw to rotate; and
the threaded portions having different diameters from each other so that one of the driving screw and driven screw axially moves relative to another one of the driving screw and driven screw to convert the rotational force of the actuator into the thrust which is applied by relative axial movement of the driving screw and the driven screw.

2. The apparatus of claim 1, wherein:
the driving screw is rotated by and axially movably supported on a rotary drive shaft driven by the rotational actuator side; and
the meshing driving screw and driven screw are rotated to axially move the driving screw to apply the thrust to the clutch unit.

3. The apparatus of claim 2, wherein the driven screw is in contact with a rotation receiver having a tapered face to receive thrust and produce reaction acting as the thrust applied to the clutch unit.

4. The apparatus of claim 1, wherein:
the driving screw is supported on and rotated by a rotary drive shaft driven by the rotational actuator, the driven screw meshing with the driving screw and being rotatably supported on a carrier that is movable in an axial direction; and
the meshing driving screw and driven screw are rotated to axially move the driven screw and the carrier to apply the thrust to the clutch unit.

5. The apparatus of claim 1, wherein:
the differential screw mechanism comprises a fixed screw and the driving screw is rotated by and axially movably supported on a rotary drive shaft driven by the rotational actuator, the fixed screw being arranged radially outward of the driving screw, the driven screw meshing with the driving screw and fixed screw; and
when the driving screw is rotated, the driven screw rotates between the driving screw and the fixed screw, to axially move the driving screw to apply the thrust to the clutch unit.

6. The apparatus of claim 5, wherein a tapered face is formed between the fixed screw and the driven screw, to receive force to produce reaction acting as the thrust applied to the clutch unit.

7. The torque transmission apparatus of claim 1, wherein:
the driving screw is rotated by and axially movably supported on a rotary drive shaft driven by the rotational actuator, the driven screw eccentrically meshes with the driving screw and the driven screw is axially immovably supported; and
the meshing driving screw and driven screw are turned to axially move the driving screw such char the driving screw axially moves to apply the thrust to the clutch unit.

8. The torque transmission apparatus of claim 7, wherein the driven screw is an internal screw with the threaded portion thereof being an internal thread, and the driving screw is eccentrically disposed within the driven screw.

9. The torque transmission apparatus of claim 8, wherein the driven screw is eccentrically disposed relative to an axis of said clutch.

10. The torque transmission apparatus of claim 1, wherein the rotational actuator is annular and has a rotary drive shaft which is arranged on center axis of the actuator, and one of the rotary members between which torque is transmitted is arranged through the axial center of the rotary drive shaft.

11. The torque transmission apparatus of claim 1, wherein:
an annular pusher is arranged between the differential screw mechanism and the clutch unit, to receive thrust from the differential screw mechanism and apply pushing force to the clutch unit; and
the clutch unit is arranged on a diametrically outer side from a location where screws of the differential screw mechanism mesh with each other.

12. A torque transmission apparatus comprising:
a clutch unit configured to receive thrust and transmit torque between rotary members;
a differential screw mechanism configured to convert rotational force into the thrust applied to the clutch unit;
a rotational actuator configured to produce the rotational force;
the differential screw mechanism having a driving screw and a driven screw that are each rotatably supported, the driving screw being driven by the rotational actuator to rotate;
each of the driving screw and the driven screw having a threaded portion, each of the threaded portions being an external thread disposed on an outer periphery of a respective one of the driving screw and the driven screw;

the external threaded portions meshing with each other to gear the driven screw to the driving screw so that the driven screw is rotated by the driving screw to rotate; and the external threaded portions having different diameters from each other so that one of the driving screw and driven screw axially moves relative to another one of the driving screw and driven screw to convert the rotational force or the actuator into the thrust which is applied by relative axial movement of the driving screw and the driven screw.

13. The apparatus of claim 12, wherein:

the driving screw is rotated by arid axially movably supported on a rotary drive shaft driven by the rotational actuator side; and the meshing driving screw and driven screw are rotated to axially move the driving screw to apply the thrust to the clutch unit.

14. The apparatus of claim 13, wherein the driven screw is in contact with a rotation receiver having a tapered face to receive thrust and produce reaction acting as the thrust applied to the clutch unit.

15. The apparatus of claim 12, wherein:

the driving screw is supported on and rotated by a rotary drive shaft driven by the rotational actuator, the driven screw meshing with the driving screw and being rotatably supported on a carrier that is movable in an axial direction; and the meshing driving screw and driven screw are rotated to axially move the driven screw and the carrier to apply the thrust to the clutch unit.

16. The apparatus of claim 12, wherein:

the differential screw mechanism comprises a fixed screw and the driving screw is rotated by and axially movably supported on a rotary drive shaft driven by the rotational actuator, the fixed screw being arranged radially outward of the driving screw, the driven screw meshing with the driving screw and fixed screw; and when the driving screw is rotated, the driven screw rotates between the driving screw and the fixed screw, to axially move the driving screw to apply the thrust to the clutch unit.

17. The apparatus of claim 16, wherein a tapered face is formed between the fixed screw and the driven screw, to receive force to produce reaction acting as the thrust applied to the clutch unit.

18. The torque transmission apparatus of claim 12, wherein:

the driving screw is rotated by and axially movably supported on a rotary drive shaft driven by the rotational actuator, the driven screw eccentrically meshes with the driving screw and the driven screw is axially immovably supported; and the meshing driving screw and driven screw are turned to axially move the driving screw such that the driving screw axially moves to apply the thrust to the clutch unit.

19. The torque transmission apparatus of claim 12, wherein the rotational actuator is annular and has a rotary drive shaft that is arranged on a center axis of the actuator, and one of the rotary members between which torque is transmitted is arranged through the axial center of the rotary drive shaft.

20. The torque transmission apparatus of claim 12, wherein:

an annular pusher is arranged between the differential screw mechanism and the clutch unit, to receive thrust from the differential screw mechanism and apply pushing force to the clutch unit; and the clutch unit is arranged on a diametrically outer side from a location where screws of the differential screw mechanism mesh with each other.

\* \* \* \* \*